(12) United States Patent
Wengrovitz et al.

(10) Patent No.: US 7,480,284 B2
(45) Date of Patent: Jan. 20, 2009

(54) SECURE VOICE AND DATA TRANSMISSION VIA IP TELEPHONES

(75) Inventors: Michael S. Wengrovitz, Concrod, MA (US); Andrew Nelson, Lynnfield, MA (US)

(73) Assignee: Alcatel Lucent, Paris (FR)

( * ) Notice: Subject to any disclaimer, the term of this patent is extended or adjusted under 35 U.S.C. 154(b) by 1024 days.

(21) Appl. No.: 10/338,161

(22) Filed: Jan. 6, 2003

(65) Prior Publication Data

US 2003/0128696 A1    Jul. 10, 2003

Related U.S. Application Data

(60) Provisional application No. 60/346,648, filed on Jan. 8, 2002.

(51) Int. Cl.
*H04L 12/66* (2006.01)

(52) U.S. Cl. .................................. 370/352; 370/395.52

(58) Field of Classification Search .................. 370/352, 370/353, 356, 392, 395.52, 401, 493, 494, 370/495
See application file for complete search history.

(56) References Cited

U.S. PATENT DOCUMENTS

| | | | | |
|---|---|---|---|---|
| 6,070,198 | A * | 5/2000 | Krause et al. | 719/321 |
| 6,272,633 | B1 * | 8/2001 | Duke et al. | 713/171 |
| 7,006,494 | B1 * | 2/2006 | Tighe et al. | 370/389 |
| 2001/0043699 | A1 | 11/2001 | Kashiwagi | |
| 2002/0129236 | A1 * | 9/2002 | Nuutinen | 713/151 |
| 2002/0162116 | A1 * | 10/2002 | Read et al. | 725/106 |
| 2003/0002476 | A1 * | 1/2003 | Chung et al. | 370/352 |

FOREIGN PATENT DOCUMENTS

| | | |
|---|---|---|
| EP | 1094682 A1 | 4/2001 |
| GB | 2363549 A | 12/2001 |
| WO | 9729681 A | 8/1997 |

OTHER PUBLICATIONS

Kent S et al, "RFC 2401—Security Architecture for the Internet Protocol" Internet Citation, [Online] Nov. 1998, XP002218816, retrieved from the internet: URL:http://www.ieft.org/rfc/rfc2401/txt?number=2401.

* cited by examiner

*Primary Examiner*—Quoc D Tran

(57) ABSTRACT

An IP telephone appliance providing secure voice communication and data transmission for itself and other IP devices and applications associated with it. The IP telephone appliance incorporates a processor for converting voice signals received from a user into VoIP packets, and an IPSec stack encoding packets prior to transmission. The IP telephone appliance also encodes packets on behalf of other devices and applications prior to transmitting the packets to a destination. When encoded voice or data packets are received from a source device, the IP telephone appliance decodes the packets and determines their destination. If the IP telephone appliance is the ultimate destination, the voice/data packets are converted to voice/telephony signals and provided to the user. Otherwise, if the ultimate destination is another device on the network, the IP telephone appliance forwards the decoded packets to the ultimate destination.

14 Claims, 9 Drawing Sheets

SECURE VOICE AND DATA TRANSMISSION VIA IP TELEPHONES

CROSS REFERENCE TO RELATED APPLICATIONS

This application claims the benefit of U.S. provisional application No. 60/346,648, filed on Jan. 8, 2002, the content of which is incorporated herein by reference.

FIELD OF THE INVENTION

This invention relates generally to internet telephony, and more particularly, to providing security for internet telephony communication.

BACKGROUND OF THE INVENTION

In general terms, Virtual Private Networks (VPNs) are secure communication channels that provide data protection using encryption and authentication techniques. VPNs can be implemented, for example, according to an IPSec protocol described in Internet Engineering Task Force Request for Comment 2401 entitled "Security Architecture for the Internet Protocol," November 1998 (hereinafter referred to as RFC 2401), which is incorporated herein by reference. VPNs have become an important element in enterprise networking for securely interconnecting multiple corporate sites, remote offices, and remote workers. VPN technology helps ensure that only authorized users can access corporate network resources, and that data traffic flowing between two sites cannot be intercepted, decoded, or spoofed.

Current VPN technology allows secure voice communications over the internet via one of several methods, including security gateways, personal computers with IPSec stacks, or personal computers with dedicated secure phone software.

FIG. 1 is a schematic block diagram of a network including conventional IP telephones 10, 12 and PCs 11, 13 transmitting and receiving voice-over-IP (VoIP) packets via security gateways 14, 16. According to this architecture, the security gateways 14, 16 provide secure voice communication over an untrusted wide area network 18 by encoding and decoding VoIP packets. The security gateways also provide other network services such as firewall control and network address translation (NAT). The use of security gateways for IPSec is sometimes referred to as a bump-in-the-wire (BITW), or network-to-network VPN, architecture.

A deficiency with the BITW architecture is that a separate security gateway device having its own hardware and software needs to be purchased in addition to the IP telephone if secure communication is desired. Security gateway devices may be expensive. In addition, having a separate security gateway device implies increase in power consumption and setup complexity.

FIG. 2 is a schematic block diagram of a network providing secure voice communication via a PC 20 without a security gateway device. Instead, the PC 20 includes an IP telephony software application 22 and an IPSec stack 24. The IP telephony software application provides the basic VoIP communication over the Internet. The encoding and decoding of VoIP packets is done via the IPSec stack 24 resident within the PC. Thus, no costs need to be incurred in purchasing and maintaining a separate security gateway.

The use of the IPSec stack may be referred to as a bump-in-the-stack (BITS), or VPN client, implementation. Such an implementation, however, generally provides security only for the PC within which the IPSec stack resides. The IPSec stack may not be shared to provide secure voice communication to other IP telephony devices and/or appliances with which it may be associated.

FIG. 3 is a schematic block diagram of an alternative network configured to provide secure voice communication via a PC 30. The secure voice communication is provided via dedicated secure phone software 32 (or hardware) installed in the PC 30. The software encrypts VoIP packets using encryption techniques, such as based on the Pretty Good Privacy (PGP) technique. Such an architecture may be referred to as a bump-in-the-code (BITC) implementation.

A PC with dedicated secure phone software is susceptible to the same deficiencies as a PC with an IPSec stack. That is, security services cannot be provided to applications other than the PC within which this software resides. In addition, although the secure phone software may provide security for voice transmissions, it does not provide security for data transmission as is provided by security gateways or IPSec stacks. Instead, PCs with secure phone software transmit data in an unsecured manner using a standard IP stack 34 resident in the PC. Furthermore, the dedicated secure phone software is generally not IPSec compliant and therefore generally not interoperable with other VPN devices.

Accordingly, there is a need for a simplified, cost-efficient, all-in-one secure IP telephony device for a remote office worker or application, that provides both secure voice communication and data transmission, both for itself and for additional IP devices and applications associated with it.

SUMMARY OF THE INVENTION

The present invention is directed to an IP telephone appliance, referred to as a Virtual Private Phone (VPP), in a communications network. The IP telephone appliance includes a voice input, a voice output, a first processor, and a second processor. The voice input receives voice signals from a user, the first processor converts the voice signals into outgoing IP voice packets, and the second processor encodes and transmits the outgoing IP voice packets to a destination device, allowing for secure voice communication over the internet between the telephone appliance and the destination device. The second processor also receives incoming IP voice packets encoded by a source device, decodes the incoming IP voice packets, and if the decoded packets are destined for another device in the communications network, forwards the decoded packets to the other device. Otherwise, if the decoded packets are destined for the IP telephone appliance, the second processor invokes the first processor to convert the decoded packets into voice signals which are transmitted to the user via the voice output.

In one embodiment, the IP telephone appliance is configured to receive and decode IP data packets in addition to VoIP packets. The IP telephone appliance receives encoded data packets and decodes them. If the decoded data packets are destined for another device in the communications network, the IP telephone appliance forwards the decoded data packets to the other device. Otherwise, it invokes the first processor to convert the decoded data packets into telephony signals for voice transmission to the user.

In one embodiment, the IP telephone appliance provides secure communication for other devices on the communications network. The second processor is configured to receive from a source device IP voice or data packets destined for a destination device, and further configured to encode the IP voice or data packets and transmit the encoded packets to the destination device.

In one embodiment, the IP telephone appliance employs different encoding mechanisms based on the address of the destination device. Based on such destination address, the second processor may decide to encrypt only a payload portion or both a header and payload portion of a particular packet.

In one embodiment, the IP telephone appliance encodes and decodes packets according to an IP security protocol.

It should be appreciated, therefore, that the IP telephone appliance according to the invention provides secure voice communication and data transmission not only for itself, but also for other devices and applications associated with the appliance. According to the invention, conventional devices and applications that would otherwise not be entitled to secure communication may communicate in a secure manner via the IP telephone appliance. In addition, the IP telephone appliance itself may communicate securely without additional security gateways or other types of external security devices, allowing it to be more cost-effective and efficient than other prior art devices.

DESCRIPTION OF THE DRAWINGS

These and other features, aspects and advantages of the present invention will be more fully understood when considered with respect to the following detailed description, appended claims, and accompanying drawings where:

DETAILED DESCRIPTION

Figure 4:
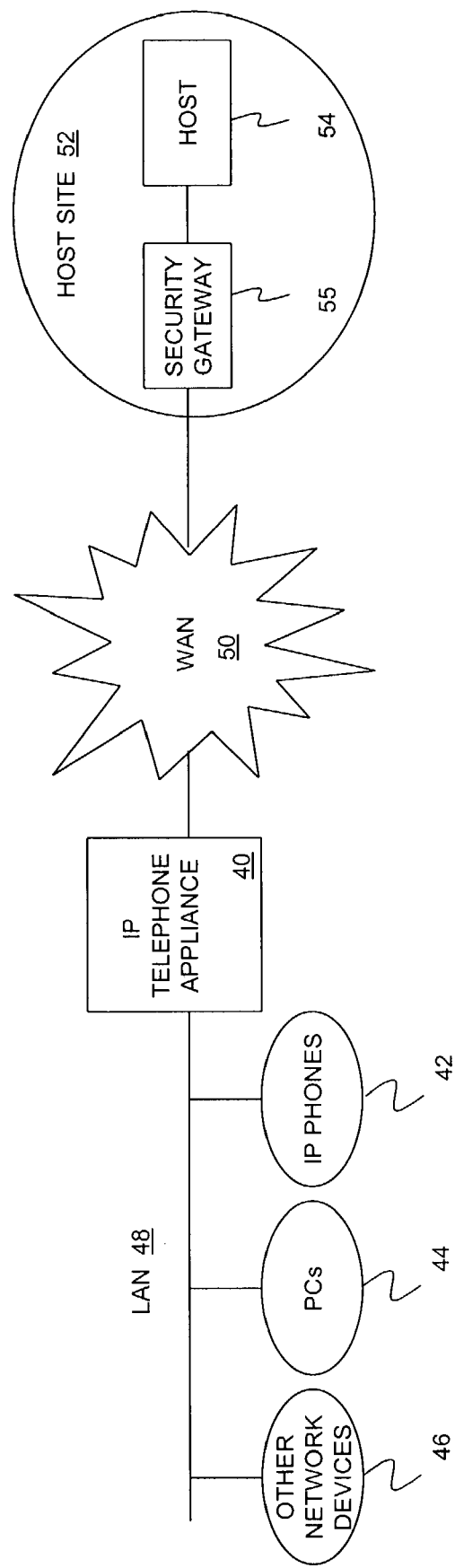
FIG. 4 is a schematic block diagram of a communications network supporting secure IP telephony and other types of secure communication according to one embodiment of the invention.

FIG. 4 is a schematic block diagram of a communications network supporting secure IP telephony and other types of secure communication according to one embodiment of the invention. In the illustrated embodiment, the network includes an IP telephone appliance 40 coupled to a wide area network (WAN) 50 and a local area network (LAN) 48 over cables and/or other transmission media such as a wireless medium. The WAN 50 may be a private WAN or a public WAN such as a public internet.

The IP telephone appliance 40 communicates with IP telephones 42, PCs 44, and other network devices 46 on the LAN using a LAN communication medium, such as Ethernet or Token Ring. Ethernet LAN communication media are not limited to 10 megabit Ethernet, but include other variants, such as Fast Ethernet, Gigabit Ethernet, 10 Gigabit Ethernet and 802.11b wireless Ethernet. The IP telephone appliance 40 also communicates with a host 54 on a host site 52 over the WAN 50 using a communication protocol such as, for example, a TCP/IP protocol.

According to one embodiment, the IP telephone appliance 40 is an IP telephone that incorporates the look and feel of a traditional telephone with a keypad, function buttons, handset, and display. Unlike a traditional telephone, however, the IP telephone appliance is enhanced with the capability of providing secure IP telephony and data communication over the WAN for itself as well as for one or more of the network devices 42, 44, 46 on the LAN 48. This architecture may be referred to as a bump-in-the-phone (BITP) architecture.

In alternative embodiments, the IP telephone appliance 40 may be implemented as a portable telephone, portable digital assistant (PDA), personal computer, or any other wired or wireless end user device that is conventional in the art.

A user may use the IP telephone appliance 40 to initiate and receive secure telephone calls with the host 54 on the host site 52 over the WAN 50 using any WAN interface that is conventional in the art. The host site 52 may include a device for providing the secure communication for the host 54, such as, for example, a security gateway 55 coupled to the host.

In addition, the IP telephone appliance 40 receives voice and data packets from the devices 42, 44, 46 on the LAN 48, secures the packets, and transmits the secured packets to either the host 54 or to another remote destination device. The IP telephone appliance 40 also receives secured inbound voice and data packets, decodes these packets, and either provides them to the user of the appliance or forwards them to one of the destination devices on the LAN.

In addition to the above, the IP telephone appliance 40 includes firewall and NAT capability to prevent unauthorized access. In this regard, the IP telephone appliance 40 secures voice for itself and on behalf of its clients, and also provides firewall protection for its telephone and on behalf of its LAN clients.

Figure 5:
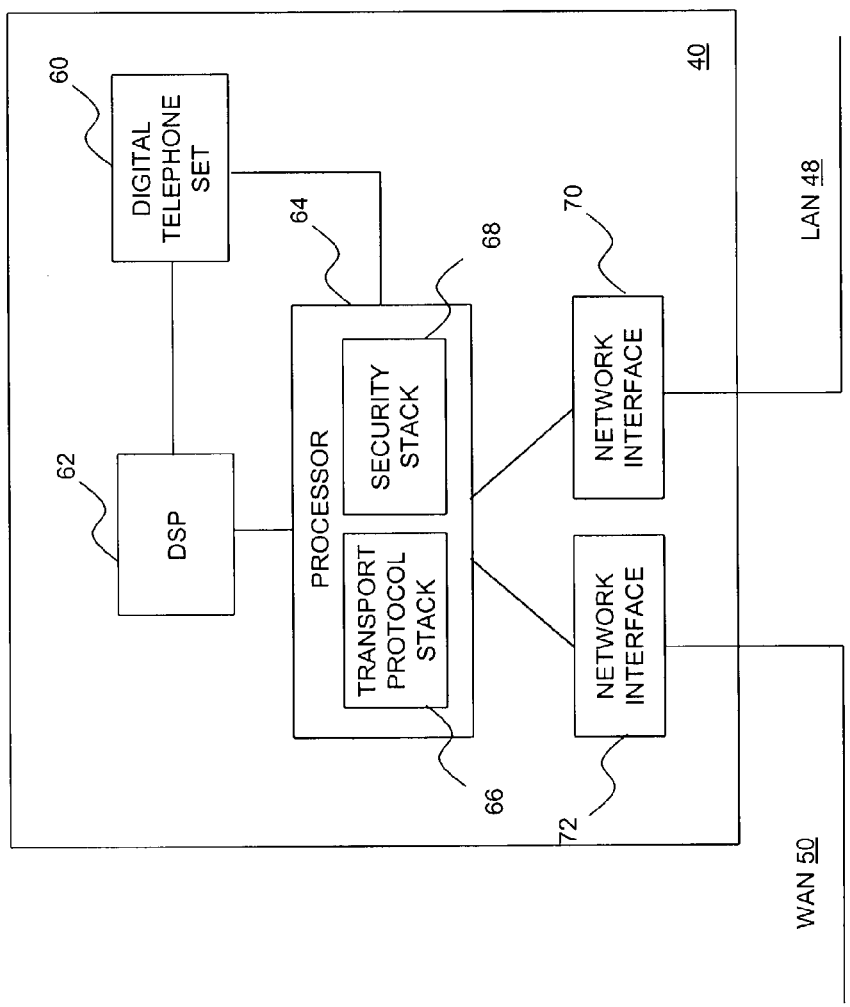
FIG. 5 is a schematic block diagram of an IP telephone appliance according to one embodiment of the invention.

FIG. 5 is a more detailed schematic block diagram of the IP telephone appliance 40 according to one embodiment of the invention. In the illustrated embodiment, the appliance 40 includes a digital telephone set 60 coupled to a digital signal processor (DSP) 62 and central processor 64. The central processor is further coupled to two network interfaces 70, 72. According to one embodiment, the first network interface 70 is used to communicate with the devices 42, 44, 46 on the LAN 48 and the second network interface 72 is used to communicate with the host 54 over the WAN 50.

The central processor 64 includes a security stack 68 and a network protocol stack 66. The security and network protocol stacks 68, 66 may be implemented in software, hardware, firmware (e.g. via an application-specific integration circuit), or in any combination thereof. For example, the security and network protocol stacks may be separate processors implementing security and VoIP algorithms. Alternatively, the security and network protocol stacks may be software routines executed on a single processor.

According to one embodiment of the invention, the security stack 68 is an IPSec stack as set forth in RFC 2401. The network protocol stack may be a conventional transport protocol stack such as, for example, a H.323 stack, Session Initiation Protocol. (SIP) stack, media gateway control protocol (MGCP) stack, or the like. A person skilled in the art should recognize that other types of conventional transport protocols and security mechanisms and may be utilized as is known in the art without being limited to the disclosed protocols and security mechanisms.

Figure 6:
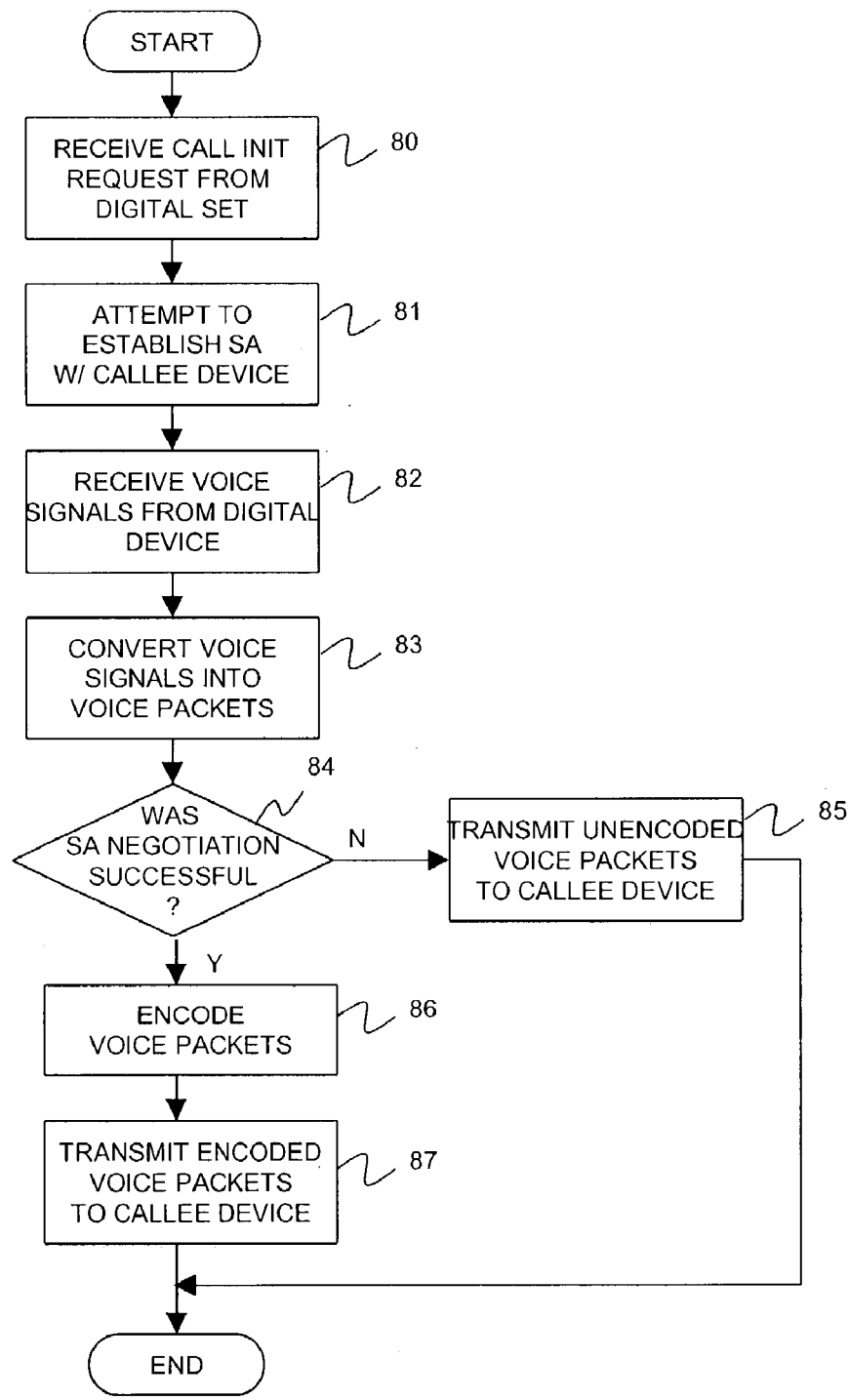
FIG. 6 is a flow diagram illustrating the processing of an outgoing call initiated by a user of the IP telephone appliance of FIG. 5 according to one embodiment of the invention.

FIG. 6 is a flow diagram illustrating the processing of an outgoing call initiated by a user of the IP telephone appliance. 40 according to one embodiment of the invention. The process starts as a user of the IP telephone appliance 40 utilizes the digital telephone set 60 to initiate the outgoing call according to conventional mechanisms. In step 80, the central processor 64 receives a request to initiate the call from the digital set, and in step 81, attempts to establish a security association (SA) with the callee device as set forth in RFC 2401.

Voice signals initiated by the user are provided to the digital telephone set 60 which digitizes and forwards the signals to the DSP 62 in step 82. In step 83, the DSP 62 segments, compresses, and packetizes the voice signals in a manner that is conventional in the art. If the SA negotiation of step 81 was unsuccessful, as determined in step 84, the central processor 64 transmits the voice packets to the callee device via its WAN network interface 72 without encrypting the packets. Alternatively, with a different IP telephone management/configuration setup, the central processor 64 does not transmit the voice packet at all.

Otherwise, if the SA negotiation was successful, the central processor 64 invokes the security stack 68 for encoding the voice packets in step 86 in a manner well known in the art. According to one embodiment, the security stack encodes the voice packets in the same manner regardless of the destination of the packets. According to another embodiment, the security stack employs different encoding mechanisms depending on the source, destination, port, or other selectors as identified in RFC 2401. For example, a transport mode of encryption may be utilized for encoding voice packets transmitted to one device on the LAN 48, causing only the payload data to be encoded, while a tunnel mode of encryption may be utilized for encoding voice packets transmitted to another device outside the LAN, causing both the header and payload data to be encoded.

Once the voice packets are encoded, the processor 64 invokes, in step 87, the network protocol stack 66 for transmitting the encoded voice packets to their destinations on the LAN 48 or over the WAN 50 via the respective network interfaces 72, 70.

Figure 7A:
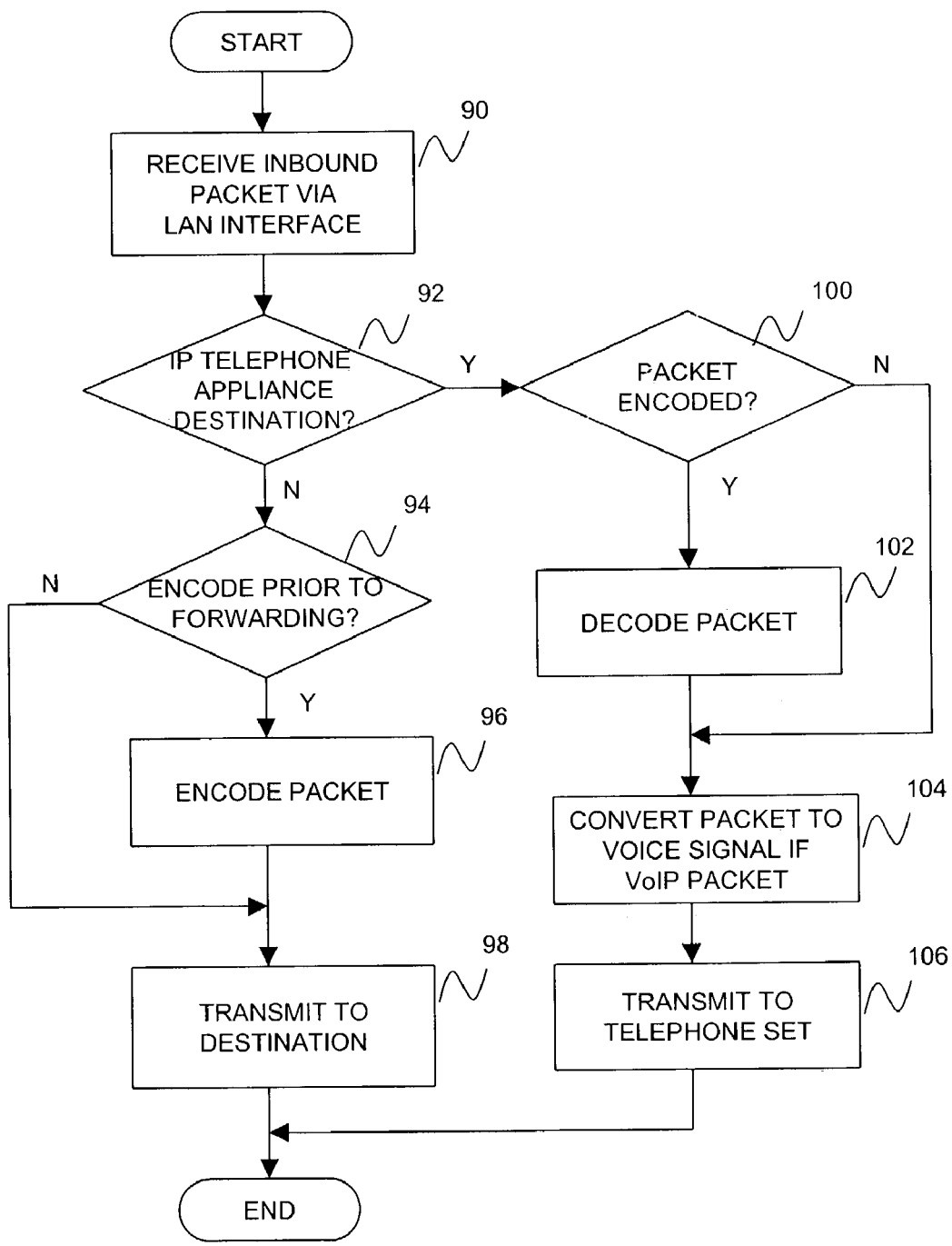
FIG. 7A is a flow diagram of the processing of inbound packets received by the IP telephone appliance of FIG. 5 over a LAN interface according to one embodiment of the invention.

FIG. 7A is a flow diagram of the processing of inbound voice or data packets received by the IP telephone appliance 40 over its LAN interface according to one embodiment of the invention. In step 90, the IP telephone appliance 40 receives an inbound packet communicated by one of the network devices 42, 44, 46 on the LAN 48, via the first network interface 70. The packet is forwarded to the central processor 64 which, in step 92, examines the packet's header data to determine if the IP telephone appliance 92 is the ultimate destination. If the answer is NO, the central processor 64 determines if the security stack 68 is to be invoked for encoding the packet prior to forwarding to its destination. If the answer is NO, the central processor 64 determines if the security stack 68 is to be invoked for encoding the packet prior to forwarding to its destination.

Several factors may determine whether to encode the packet, and if so, the type of encoding to be performed. For example, if the packet received has already been encoded by the transmitting device itself, no encoding may be performed. Alternatively, the IP telephone appliance may decide to encode the packet even if already encoded, but using an encryption mode different than the one employed by the encoding device.

In another example, the IP telephone appliance 40 may not encode the packet if it is to be forwarded to another device on the LAN 48, or if encoding is to be done, only the payload data may be encoded via the transport encryption mechanism. However, if the packet is to be forwarded to a device outside the LAN, both the header and payload data may be encoded via the tunnel encryption mechanism.

In yet another example, the encoding determination may be based on whether a successful SA was negotiated with the ultimate destination. The packet is encoded if a successful SA negotiation was made.

If the security stack 68 determines that the packet should be encoded, the packet is encoded in step 96, and the encoded packet transmitted to its destination in step 98. Otherwise, if no encoding is to be done, the packet is transmitted to the destination without encoding.

Referring again to step 92, if the IP telephone appliance 40 is the ultimate destination, a determination is made as to whether the received packet is an encoded packet that needs to be decoded, as is determined in step 100. In step 102, the security stack 68 proceeds to decode the packet, and transmits the decoded packet to the DSP 62.

If the packet is a VoIP packet, the DSP 62, in step 104, converts the packet to a voice signal. In step 106, the converted signal or data is transmitted to the telephone set 60.

Figure 7B:
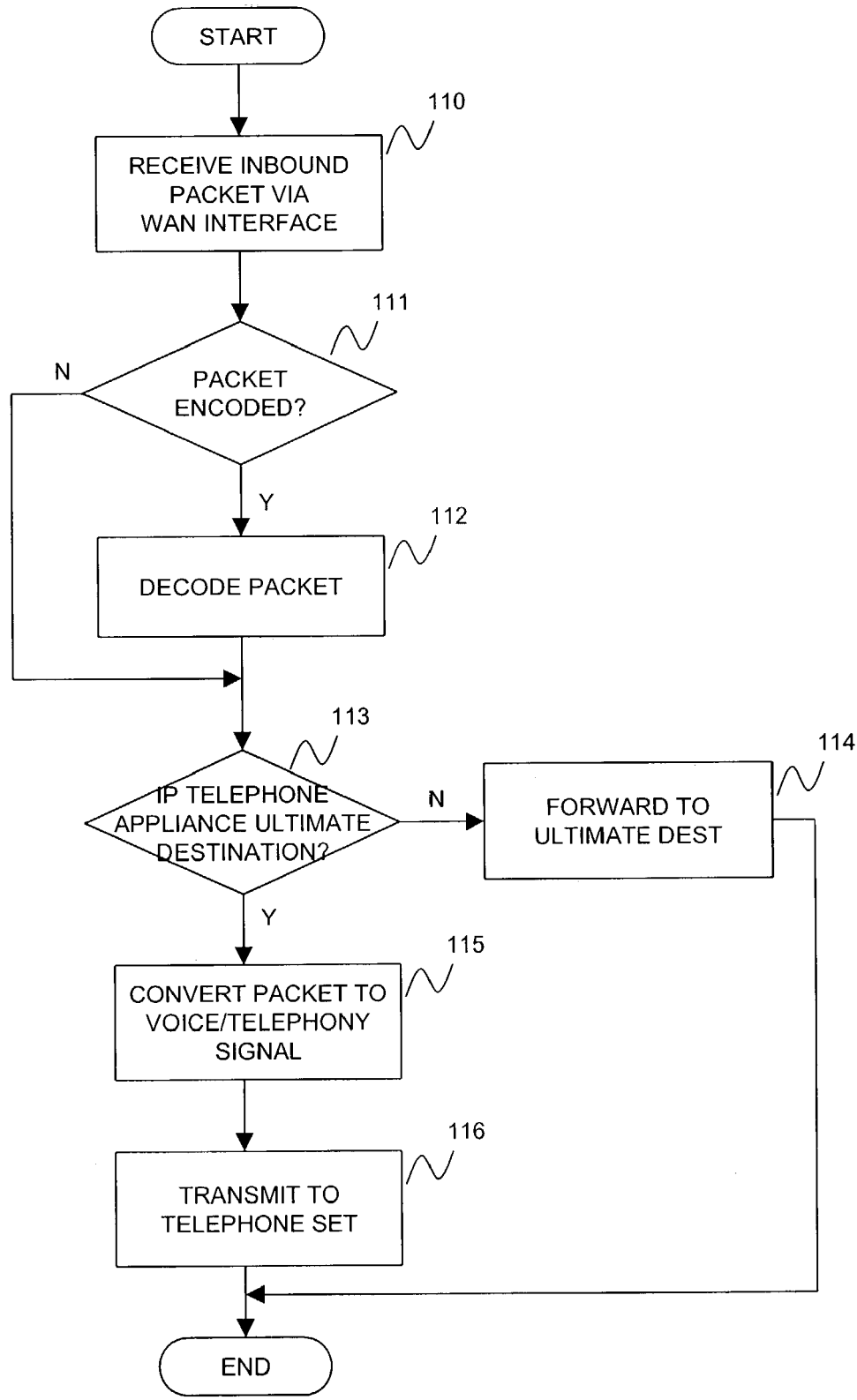
FIG. 7B is a flow diagram of the processing of inbound packets received by the telephone appliance of FIG. 5 over a WAN interface according to one embodiment of the invention.

FIG. 7B is a flow diagram of the processing of inbound voice or data packets received by the IP telephone appliance 40 over a WAN interface according to one embodiment of the invention. In step 110, the IP telephone appliance 40 receives an inbound voice or data packet communicated by the host 54 over the WAN 50 via the second network interface 72. The packet is forwarded to the central processor 64 which, in step 111, determines according to conventional mechanisms whether the packet has been encoded. If the packet has been encoded, the security stack 68 proceeds to decode the packet in step 112.

In step 113, the central processor 64 examines the decoded packet's header data for determining if the IP telephone appliance 92 is the ultimate destination. If the answer is NO, the decoded packet is forwarded to its ultimate destination in step 114.

Otherwise, if the packet's ultimate destination is the IP telephone device 40, the packet is transmitted to the DSP 62. If the packet is a VoIP packet, the DSP 62, in step 115, converts the packet to a voice signal. In step 116, the converted signal is transmitted to the telephone set 60.

Figure 8:
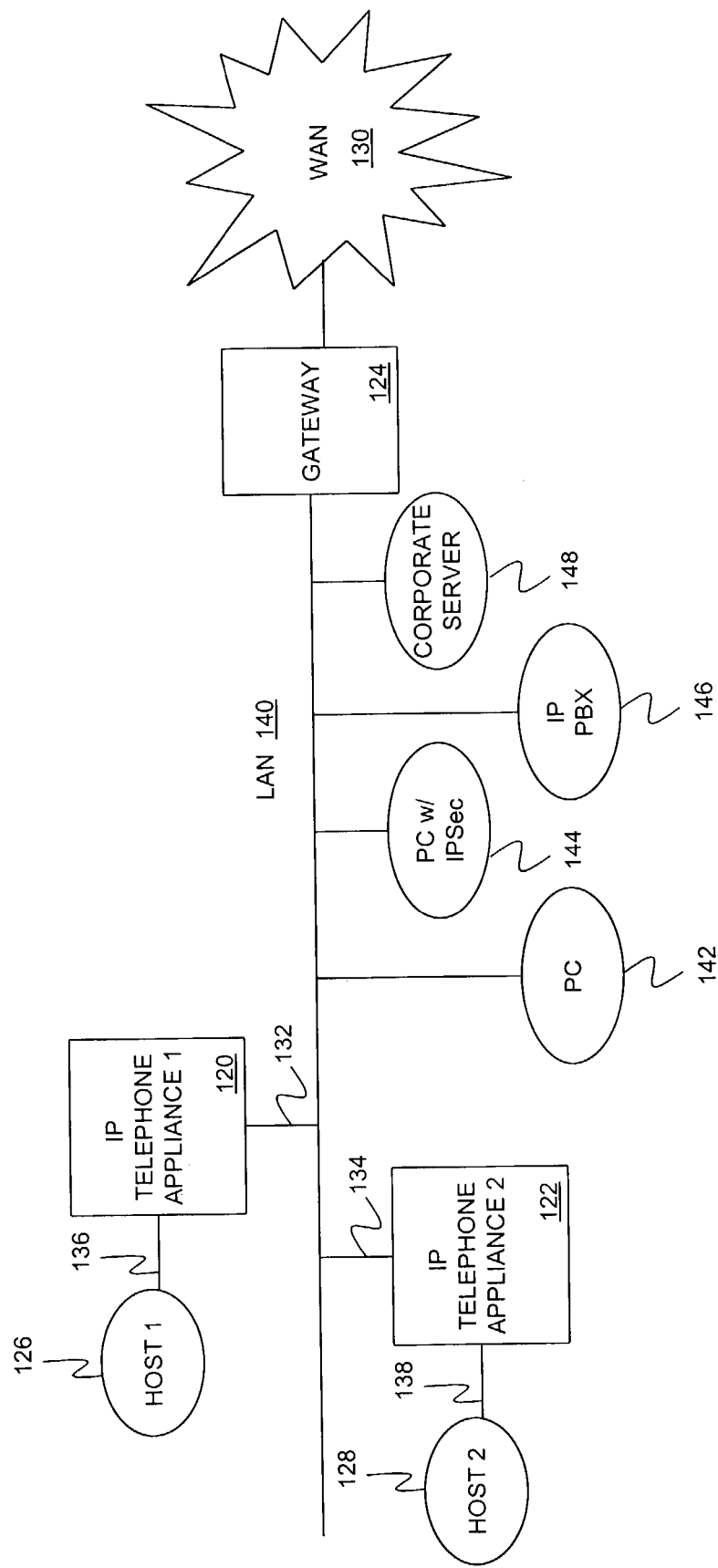
FIG. 8 is a block diagram of an alternate communications network supporting secure IP telephony and other types of secure communication according to one embodiment of the invention.

FIG. 8 is a block diagram of an alternate communications network supporting secure IP telephony and other types of secure communication according to one embodiment of the invention. The network includes IP telephone appliances 120, 122, coupled to a LAN 140 over a first network interface 132, 134, and to a host 126, 128 over a second network interface 136, 138. The LAN 140 is in turn coupled to a gateway 124 that provides access to a WAN 130 in a manner that is conventional in the art. The LAN 140 may also support other devices such as a PC 142, a PC with an internal IPSec stack 144, an IP PBX 146, and a corporate server 148.

The IP telephone appliances 120, 122 are similar to the IP telephone appliance 40 of FIGS. 4 and 5. One difference, however, is the use of one of the network interfaces for connecting to the host 126, 128.

The hosts 126, 128 may be wired or wireless end user devices such as PCs, conventional IP telephones, PDAs, or the like. Although FIG. 8 depicts only one host attached to each IP telephone appliance 120, 122 a person skilled in the art should recognize that multiple hosts could also be attached.

Figure 1:
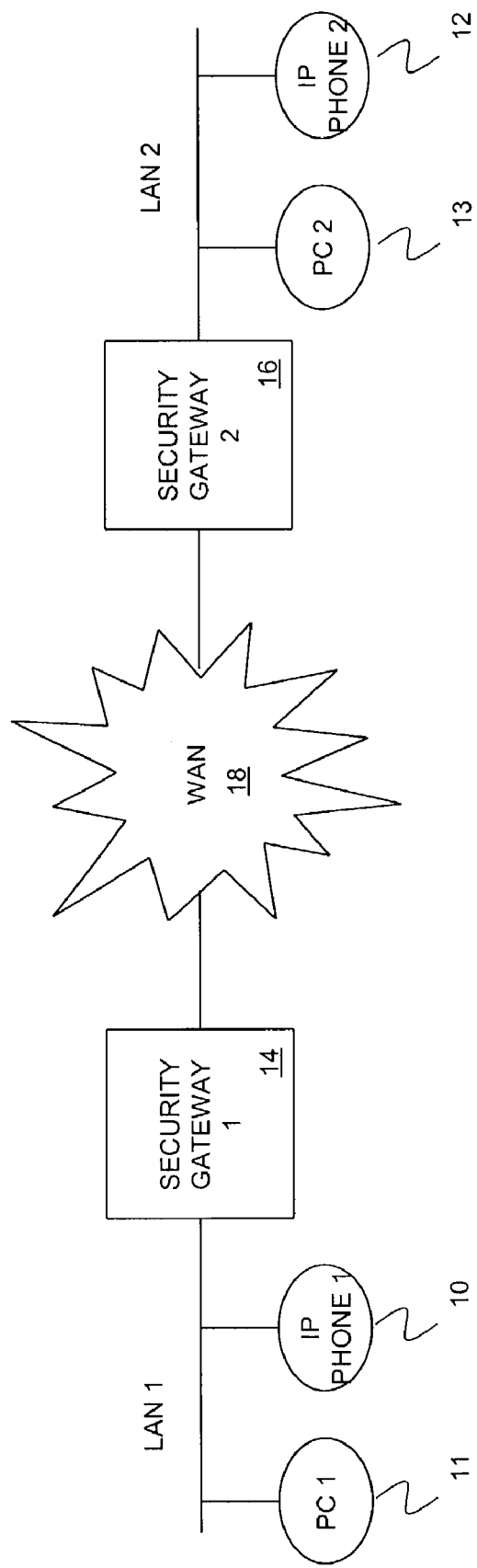
FIG. 1 is a schematic block diagram of a network including conventional IP telephones and PCs transmitting and receiving voice-over-IP (VoIP) packets via security gateways.
Figure 2:
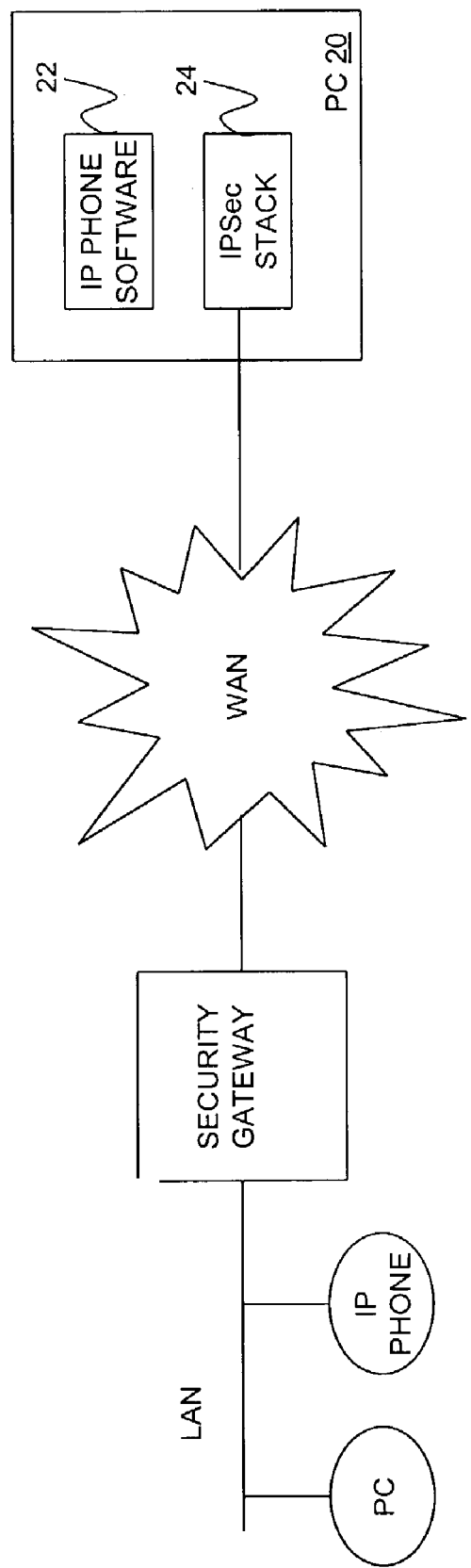
FIG. 2 is a schematic block diagram of a network providing secure voice communication via a PC without a security gateway.
Figure 3:
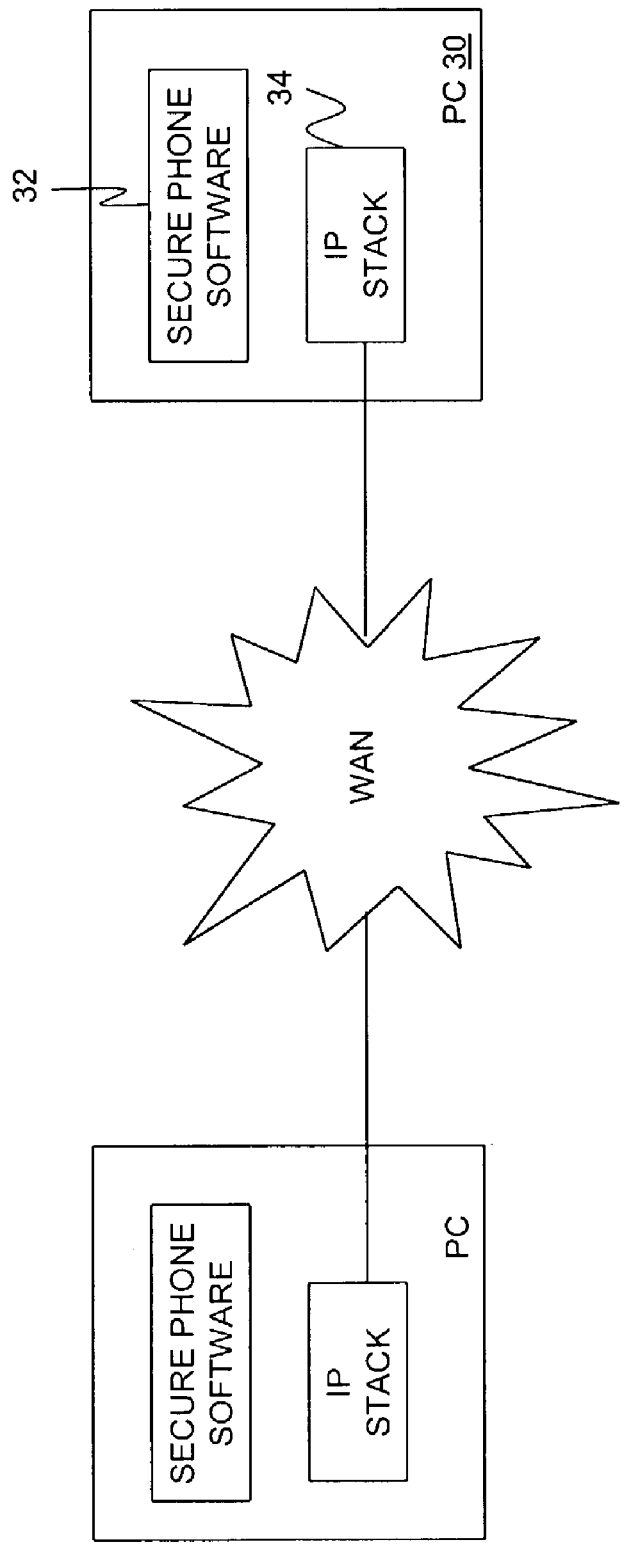
FIG. 3 is a schematic block diagram of an alternative network providing secure voice communication via a PC.

The gateway 124 may be a conventional gateway providing access to the WAN 130, and may provide other types of network services such as NAT, and firewall, and/or IPSec services. In the embodiment where the gateway 124 provides IPSec services, the gateway may implemented as a security gateway similar to the security gateway 14, 16 of FIG. 1.

According to the embodiment illustrated in FIG. 8, a host 126 or 128 transmits a packet, such as an instant message packet, to its respective IP telephone appliance 120, 122. The IP telephone appliance attempts to establish an IPSec SA with a destination device. If the SA negotiation between a host and the destination is not successful, the packet is transmitted to the destination in an unprotected manner without encoding. In an alternative embodiment, the packet is not transmitted at all.

However, if the destination device has an internal IPSec stack, such as is the case with PC 144, or is attached to one of the IP telephone appliances 120, 122, such as host 126 or 128, the SA negotiation is successful. The packet is then encoded by the IP telephone appliance and transmitted to the destination in a secure manner.

According to one embodiment, the IP telephone appliance 120, 122 determines the type of encoding based on the destination information. According to one embodiment, a table of IP addresses (not shown) indicates whether a connection to the indicated address is to be based on a transport mode of encryption or a tunnel mode of encryption. If the transport mode of encryption is indicated, only a payload portion of the packet is encrypted as provided by IPSec. If the tunnel mode of encryption is indicated, both an address and payload portion of the packet are encrypted as also provided by IPSec. The address of the security gateway may also be encrypted in the tunnel mode of encryption. VoIP packets may also be encoded in the above-described manner.

For example, the table of IP addresses may indicate the transport mode of encryption for addresses of destination devices that reside on the LAN 140. However, if the destination resides on the LAN 140 behind the gateway 124, or on the WAN 130, an inherently untrustworthy network, the table of IP addresses may indicate the tunnel mode of encryption.

According to another embodiment, if the gateway 124 is a security gateway that implements the tunnel mode of encryption, the IP telephone appliance 120, 122 encrypts packets according to the transport mode of encryption for all packets regardless of their destination. In this manner, packets to be transmitted over the LAN are encrypted only in the payload area by the IP telephone appliance 120, 122 whereas packets to be transmitted to devices behind the gateway 124, such as, for example, to devices on the WAN 130, are encrypted in the payload area by the IP telephone appliance 120, 122 and in both the payload and header areas by the security gateway 124, providing double security for the packet.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. An internet protocol (IP) telephone appliance in a communications network comprising:
    a digital phone set, said digital phone set including a voice input;
    said digital telephone set including a voice output;
    a digital signal processor;
    at least one processing module coupled to each of said digital signal processor and said digital telephone set, said at least one processing module including a transport protocol stack and a security stack;
    a local area network interface coupled to said at least one processing module; and
    a wide area network interface coupled to said at least one processing module;
    characterized in that the voice input receives incoming voice signals from a user, the at least one processing module converts the incoming voice signals into outgoing IP voice packets, encodes the outgoing IP voice packets and transmits the outgoing IP voice packets to a destination device, further characterized in that the at least one processing module receives incoming IP voice packets encoded by a source device, decodes the incoming IP voice packets, and if the decoded packets are destined for another device in the communications network, forwards the decoded packets to the other device, and otherwise converts the decoded packets into outgoing voice signals and transmits the outgoing voice signals to the user via the voice output;
    and further characterized in that the at least on processing module, in encoding a particular packet, determines whether to encrypt a payload portion of the particular packet or both a header and the payload portion of the particular packet base on an address of the destination device.

2. The IP telephone appliance of claim 1 and further wherein:
    said wide area network interface for transmitting the outgoing IP voice packets encoded by the at least one processing module and for receiving the incoming IP voice packets encoded by the source device; and
    said local area network interface for forwarding the incoming IP voice packets decoded by the at least one processing module.

3. The IP telephone appliance of claim 1 further characterized, in that the at least one processing module receives incoming IP data packets encoded by the source device and decodes the incoming data packets.

4. The IP telephone appliance of claim 1, further characterized in that the at least one processing module receives from a second source device IP voice or data packets destined for a second destination device, encodes the IP voice or data packets, and transmits the encoded packets to the second destination device.

5. The IP telephone appliance of claim 4 further comprising a local area network interface for receiving the IP voice or data packets from the second source device and a wide area network interface for transmitting the encoded packets to the second destination device.

6. The IP telephone appliance of claim 4 further comprising a local area network interface for receiving the IP voice or data packets from the second source device and for transmitting the encoded packets to the second destination device.

7. The IP telephone appliance of claim 1, wherein the at least one processing module encodes and decodes packets according to an IP security protocol.

8. The IP telephone appliance of claim 1, wherein a first processing module converts the incoming voice signals into the outgoing IP voice packets, and further converts the decoded packets into the outgoing voice signals and transmits the outgoing voice signals to the user via the voice output, and wherein a second processing module encodes the outgoing IP voice packets and transmits the outgoing IP voice packets to the destination device, and further receives the incoming IP voice packets encoded by the source device, decodes the incoming IP voice packets, and if the decoded packets are destined for the other device in the communications network, forwards the decoded packets to the other device, and otherwise invokes the first processing module to convert the decoded packets into the outgoing voice signals and transmit the outgoing voice signals to the user via the voice output.

9. An internet protocol (IP) telephone appliance in a communications network comprising:
- a voice input;
- a voice output; and
- a processing module including a transport protocol stack and a security stack;
- characterized in that the voice input receives incoming voice signals from a user, the processing module converts the incoming voice signals into outgoing IP voice packets, encodes the outgoing IP voice packets and transmits the outgoing IP voice packets to a destination device, further characterized in that the processing module receives incoming IP voice packets encoded by a source device, decodes the incoming IP voice packets, forwards ones of the decoded packets which are destined for another device in the communication network to the other device, and converts ones of the decoded packets which are destined for the IP telephone appliance into outgoing voice signals and transmits the outgoing voice signals to the user via the voice output;
- and further characterized in that the processing module, in encoding a particular packet, determines whether to encrypt a payload portion of the particular packet or both a header and the payload portion of the particular packet based on an address of the destination device.

10. The IP telephone appliance of claim 9 further comprising:
- a wide area network interface for transmitting the outgoing IP voice packets encoded by the processing module and for receiving the incoming IP voice packets encoded by the source device; and
- a local area network interface for forwarding the incoming IP voice packets decoded by the processing module.

11. The IP telephone appliance of claim 9 further characterized in that the processing module receives incoming IP data packets encoded by the source device and decodes the incoming data packets.

12. The IP telephone appliance of claim 9, further characterized in that the processing module receives from a second source device IP voice or data packets destined for a second destination device, encodes the IP voice or data packets, and transmits the encoded packets to the second destination device.

13. The IP telephone appliance of claim 9, wherein the processing module encodes and decodes packets according to an IP security protocol.

14. The IP telephone appliance of claim 9, wherein the processing module provides firewall protection for preventing unauthorized access.

* * * * *